United States Patent
Mottus et al.

[15] 3,674,766
[45] July 4, 1972

[54] POLYMERIZATION OF ETHYLENE AND CATALYSTS THEREFOR

[72] Inventors: Edward H. Mottus, Ballwin, Mo.; Morris R. Ort, Seabrook, Tex.

[73] Assignee: Monsanto Company, St. Louis, Mo.

[22] Filed: Sept. 16, 1968

[21] Appl. No.: 763,485

Related U.S. Application Data

[63] Continuation-in-part of Ser. No. 671,952, Oct. 2, 1967, abandoned.

[52] U.S. Cl....................260/88.2, 252/429 A, 252/429 B, 252/429 C, 260/85.3, 260/94.9 B, 260/94.9 C, 260/94.9 E, 260/429 J
[51] Int. Cl..........................................C08f 1/32, C08f 3/06
[58] Field of Search.................260/429 J, 429, 88.2, 94.9 B, 260/94.9 C, 94.9 E; 252/429 A, 431

[56] References Cited

UNITED STATES PATENTS

| | | | |
|---|---|---|---|
| 2,962,451 | 11/1960 | Schieger | 252/429 |
| 2,984,658 | 5/1961 | Seydel et al. | 260/94.9 |
| 3,007,908 | 11/1961 | Graf et al. | 260/94.9 |
| 3,014,939 | 12/1961 | Kluiber | 260/429 |
| 3,051,690 | 8/1962 | Vandenberg | 260/88.2 |
| 3,116,274 | 12/1963 | Boehm et al. | 260/94.9 |
| 3,247,173 | 4/1966 | Shearer et al. | 260/88.2 |
| 3,328,366 | 6/1967 | Nakaguchi et al. | 260/88.2 |
| 3,458,483 | 7/1969 | Dubsky et al. | 260/94.9 |
| 3,370,041 | 2/1968 | Kornicker et al. | 260/94.9 |
| 3,026,311 | 3/1962 | Coover et al. | 260/94.9 |
| 3,509,189 | 4/1970 | Ort et al. | 260/94.9 |

FOREIGN PATENTS OR APPLICATIONS 986,349 | 3/1965 | Great Britain

OTHER PUBLICATIONS

Lehmkuhl et al., Tetrahedron Letters, No. 21, 1966, pp. 2315–2320.

*Primary Examiner*—Joseph L. Schofer
*Assistant Examiner*—Edward J. Smith
*Attorney*—John D. Upham, Joseph D. Kennedy and L. Bruce Stevens, Jr.

[57] ABSTRACT

Catalysts useful for making ethylene polymers by polymerizing ethylene alone or with a comonomer in the presence of hydrogen are described. They consist essentially of a mixture of (1) a bromo and/or ioda aluminum compound, preferably of the formula

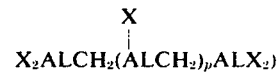

wherein X is a halogen atom with at least one X being a bromine or iodine atom or a mixture of such compounds with each other and $p$ is 0 or 1 and (2) a compound of a transition metal of Groups III–B, IV–B, V–B, VI–B, VII–B, VIII or 1–B of the Periodic Table, preferably vanadium. The combined bromine or iodine renders the catalyst composition more sensitive to hydrogen employed for molecular weight control so that the ethylene polymers which are obtained at a given hydrogen partial pressure have a higher melt index than those which are obtained with the same type of organo-aluminum compound which does not contain the specified bromine or iodine constituent. The polymerization can be carried out in the presence of an inert solvent such as hexane, or a halogenated compound such as dichloromethane or dibromomethane, at a pressure from about 2 to about 10 atmospheres and employing an electron-donating compound such as t-butanol or water to modify the catalyst.

23 Claims, No Drawings

POLYMERIZATION OF ETHYLENE AND CATALYSTS THEREFOR

This application is a continuation-in-part of copending application Ser. No. 671,952, filed Oct. 2, 1967, and now abandoned. This application relates to new catalysts and catalyst components for polymerizing or copolymerizing ethylene to give higher melt index products.

In copending applications Ser. Nos. 621,036, 620,670 now U.S. Pat. No. 3,516,978 issued June 23, 1970 and 621,035, all filed Mar. 6, 1967, are described catalysts for polymerizing olefinic compounds such as ethylene, one of the components of some of these catalysts is a vanadium compound with the other component being a compound such as $Cl_2AlCH_2AlCl_2$ and these catalysts have extremely high catalyst activity. These catalysts, e.g., $Cl_2AlCH_2AlCl_2 + VOCl_3$ polymerize ethylene or makes copolymers thereof to give a polymer having too low a melt index for some uses, i.e., the molecular weight of the polymer is too high and narrow excluding low molecular weight components which would increase the melt index. With hydrogen treatment during polymerization the melt index is increased to what is considered a more useful range. The melt index increases as the hydrogen partial pressure increases.

Now it has been found that if bromine and/or iodine replaces a part or all of the chlorine in, for example, $Cl_2AlCH_2ICl_2$ that higher melt index polymer is obtained at the same hydrogen partial pressure. The new catalysts for polymerizing or copolymerizing ethylene comprise an organoaluminum compound, preferably a compound of the formula

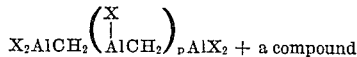 + a compound of a transition metal of Groups III-B, IV-B, V-B, VI-B, VII-B, VIII or I-B of the Periodic Table, preferably a vanadium compound such as a salt or oxide, however, other vanadium compounds and also titanium compounds are especially suitable, e.g., alkoxy or acetyl acetonate compounds, where X is a halogen atom and $p$ is 0 or 1, provided at least one X is a bromine or iodine atom. When these new catalysts are used to make polymers or copolymers of ethylene, higher melt index products are obtained than with no bromine or iodine present when the same hydrogen partial pressure is used.

The bromo and/or iodo aluminum catalyst components are illustrated as follows: $Br_2AlCH_2AlBr_2$, $I_2AlCH_2AlI_2$, $BrClAlCH_2AlCl_2$, $Br_2AlCH_2AlCl_2$, $BrClAlCH_2AlBrCl$, $Br_2AlCH_2BrCl$, $IClAlCH_2AlCl_2$, $I_2AlCH_2AlCl_2$, $IClAlCH_2ICl$, $I_2AlCH_2AlICl$, $BrIAlCH_2AlBr_2$, $BrIAlCH_2AlCl_2$, $Br_2AlCH_2IBrCH_2AlBr_2$, $I_2AlCH_2AlICH_2AlI_2$. These compounds and others can be prepared by the process of copending application Ser. No. 670,416, filed Sept. 25, 1967, now U.S. Pat. No. 3,509,190 issued Apr. 28, 1970, wherein a hydrogen halide, an organic halide and aluminum are reacted, or by a process of copending application Ser. No. 669,306, filed Sept. 20, 1967, now U.S. Pat. No. 3,509,189 issued Apr. 28, 1970, wherein methylene dibromide or methylene diodide is reacted with aluminum, and this application also describes the making of $Cl_2AlCH_2AlCl_2$.

Rather than using the bromo or iodo aluminum catalyst components described in the previous paragraph, the following bromo and/or iodo aluminum compounds can be used to obtain low melt index polymer, e.g., $C_2H_5AlBr_2$, $(C_2H_5)_3Al_2Br_3$, $C_2H_5AlI_2$, $(C_2H_5)_3Al_2I_3$, $(C_2H_5)_2AlBr$, $(C_2H_5)_2AlI$ and the like; furthermore, instead of ethyl, other alkyl groups can be used or even other hydrocarbon groups such as phenyl, benzyl, cyclohexyl, tolyl and the like. In other words, although the preferred bromo or iodo aluminum compounds are those described in the previous paragraph, more broadly the invention involves the use of any organoaluminum compound having a bromo or iodo atom attached to the aluminum.

In some cases mixtures of the above compounds will be made depending on the reactants and ratio of reactants, and the mixtures are as usable as catalyst components as the individual compounds.

Suitable vanadium catalyst components are illustrated as follows:

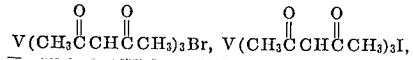

$VOBr_3$, $VOI_3$, $VOCl_2Br$, $VOCl_2I$, $VOClBrI$, $VOClI_2$, $VOClBr_2$, $VOBrI_2$, $VOBr_2I$. The first two of the vanadium compounds are new compounds and the making thereof is described in Examples 5 and 6 below; the other vanadium compounds can be made by reacting $VOCl_3$ with bromine and/or iodine with mixtures of some of the compounds resulting in some cases depending on reactants and ratio of reactants, and the mixtures of compounds are as usable as catalyst components as the individual compounds.

Other transition metal compounds which can be used are described in detail in copending application Ser. No. 621,036, filed Mar. 6, 1967 and the titanium compounds named therein are especially suitable, i.e., compounds such as $(R^4Z)_mTiX'_{4-m}$ and $R^3D\cdot TiX'4$. In a companion application of even date, Ser. No. 760,051 n-butoxy titanium trichloride was used with methylene bis(aluminum dibromide) as a catalyst for polymerizing ethylene; furthermore, this copending application is a companion application to the present application with many of the catalysts in each being usable interchangeably in the process of the other, e.g., $VOF_3$ and $VCl_4$ exemplified in this copending application can be used instead of $VOCl_3$ in the process of this application. Also instead of $VOCl_3$ there can be used vanadium acetylacetonate of the formula

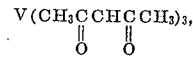

tris(dimethylamino)vanadyl of the formula $[(CH_3)_2N]_3VO$ and the like. Especially preferred are three- to five-valent vanadium compounds.

Copending application Ser. No. 621,036, filed Mar. 6, 1967 teaches that electron donor compounds such as water and alcohols can be added to modify catalyst activity. The amount of electron donor compound to use is a sufficient amount to modify, but not kill, the catalyst activity. Tertiary alcohols such as t-butanol are especially suitable. Other electron donor compounds mentioned in the copending application are also useful to modify catalyst activity.

In copending application Ser. No. 621,036, oxygen is disclosed as a catalyst poison along with water and a number of other electron donor compounds, but it is also disclosed that limited quantities of the catalyst poisons will sometimes modify catalyst activity. We have discovered that limited quantities of oxygen will promote catalyst activity apparently by maintaining the catalyst activity at high level. The oxygen can be added with the ethylene being polymerized, with the hexane and/or directly, or in other ways which will be obvious to those skilled in the art. A sufficient amount of oxygen is added to promote catalyst activity and this may vary from an equimolar amount or less based on the transition metal component of the catalyst on up to equimolar based on the aluminum compound or even higher. It may be that a total of considerably more than an equimolar amount of oxygen may be added for a number of catalyst rejuvenation treatments. Measuring of oxygen is done in the vapor phase of practical necessity and so the estimates of oxygen concentration in the reactor are based on these vapor phase measurements; however, the oxygen is effective in the liquid phase and it is possible that changes in reactor size, shape and conditions of operation could affect the oxygen concentration needed to promote catalyst activity.

It is probably that other oxidizing agents than oxygen can be used, preferably oxidizing agents which are at least partially soluble in the reaction medium, such as peroxides, hydroperoxides, especially quinones such as quinone and naphthoquinone, ceric salts such as ceric acetyl acetonate, cobalt acetyl acetonate, stannic salts, etc.

The amount of hydrogen to use in conjunction with the ethylene being polymerized to reduce the molecular weight (increase the melt index) of the polymer is usually in the range of about 100 ppm to 95 percent by volume, preferably in the range of about 0.1 percent to 75 percent; however, to obtain the highest molecular weight polymer, no hydrogen is used. Measuring of the hydrogen concentration is done in the vapor phase of practical necessity and so the estimates of hydrogen concentration in the reactor are based on hese apor hase measurements; however, the hydrogen is effective in the liquid hase and it is possible that changes in reactor size, shape and conditions of operation could affect the hydrogen concentration needed to obtain polymer with certain desired properties.

As in the case of copending application Ser. No. 621,036, filed Mar. 6, 1967, the polymerization or copolymerization of ethylene will normally be carried out in a solvent or diluent; preferred solvents being organic solvents which will not deactivate the catalysts and which do not polymerize, i.e., inert organic solvents, especially preferred being the saturated aliphatic solvents such as hexane or halogenated solvents such as methylene dichloride, methylene dibromide and the like. Also, amounts of catalysts used in polymerization, temperatures, pressures, polymer recovery and purification methods can be the same as in this copending application except that since the vanadium catalysts have such high activity normally and thus can be used in such small amounts, no polymer purification is necessary other than to separate the diluent from the polymer and dry the polymer.

If a light colored polymer is needed, it may be desirable to quench the polymer slurry with methanol, preferably in the absence of oxygen (air), to solubilize the catalyst and so facilitate its removal. A hot methanol quench at about 90° C under pressure with stirring for good contacting with the methanol is especially desirable for this purpose. When the polymer slurry is then filtered after the quench to separate the polymer from the hexane and methanol very little catalyst remains in the polymer. An alternative procedure is to separate the polymer from the hexane by filtration and then to reslurry the polymer in methanol to solubilize the catalyst and refilter to separate the polymer from the methanol containing catalyst. For further details on methanol quenching copending application Ser. No. 760,051 filed of even date may be consulted.

The process of this invention can be used to make copolymers of ethylene with a minor amount by weight of any of the monomers suggested in copending application Ser. No. 621,036, filed Mar. 6, 1967, and is especially useful for copolymerizing ethylene with minor amounts (i.e., less than 50 percent by weight in the mixture with ethylene) of other ethylenically unsaturated hydrocarbon monomers such as propylene, butene-1, hexene-1, styrene, butadiene, etc.

The higher melt index polymers (lower molecular weight) provided by the catalysts of this invention are more suitable for extrusion than the very high molecular weight polymers, the lower molecular weight polymers giving much higher extrusion rates. It may also be desirable to blend lower and higher molecular weight polymers.

The invention will be more clearly understood from the following detailed description of specific examples thereof:

In the examples which follow, the complexer for making the polymerization catalyst is a 300 ml glass vessel equipped with a magnetic stirrer and suitable ports for filling, emptying and introduction of inert atmospheres. The polymerization vessel is a 2-liter stainless steel stirred reactor equipped with suitable inlet ports, bottom drain, thermocouple, jacket for heating or cooling and a pressure gauge.

EXAMPLE 1

This example describes the use of freshly prepared (1 day old) methylene bis(aluminum dichloride) and $VOCl_3$ for the polymerization of ethylene. In this example and the other examples, every practical effort has been made to exclude water from all materials by the use of drying agents and/or molecular sieve columns to dry all materials except that small amounts of water or t-butanol are added to promote polymerization and also nitrogen blanketing of materials is used where appropriate to exclude the oxygen. The polymerization reactor was charged with 500 ml of hexane, the vent port on the reactor was opened and 20 microliters ($1.1 \times 10^{-3}$ mol) of water was added directly to the reactor. The complexer was charged with 100 ml of hexane and then with stirring 1.0 ml (0.2 millimoles) of methylene bis(aluminum dichloride) dissolved in methylene dichloride and 0.05 ml ($5.5 \times 10^{-6}$ mol) of $VOCl_3$ dissolved in methylene dichloride were added to the complexer. Stirring in the complexer was continued until the color changes were complete, indicating completion of the complexing of the catalyst. The complexed catalyst and the remaining hexane to make up to 1 liter of hexane were charged to the polymerization reactor with stirring. The reactor was closed and the reactor warmed to 38° C. The stirrer was turned off and the reactor was flushed with ethylene by pressuring to 40 psig and venting. The reactor was pressured to 45 psig with ethylene and then to 90 psig with hydrogen. The stirrer was turned on and the polymerization was run for 1 hour maintaining pressure in the reactor at 90 psig with added ethylene. During the polymerization period, due to exothermic heat of reaction, the temperature rose from 38° to 64° C. and then dropped back down to 51° C. At the end of the hour the reactor was vented, flushed two times with nitrogen, 500 ml of hexane was added to the reactor and the contents of the reactor were dumped through the bottom drain. The reactor was rinsed with 1 liter of hexane, the solid polyethylene product recovered by filtering under vacuum, the polymer dried on the filter using a rubber dam and the dried polymer was treated with 35 mg of "IONOL" dissolved in 35 ml of methanol. The polyethylene product was dried overnight in a vacuum oven at 65° C. and yield of polymer was 50.4 g. (10,080 g. of polymer/millimole $VOCl_3$). The $I_2$ melt index of the polymer was 32 dg./min. (decigrams per minute), the melt index test being a standard test used in the art, ASTM No. D-1238-57T (condition E). The methylene bis(aluminum dichloride) used in this experiment was made in a similar manner to that described in copending application Ser. No. 620,669, filed Mar. 6, 1967, now abandoned.

EXAMPLE 2

This experiment shows the effect of allowing the methylene bis(aluminum dichloride) to age for 9 days before use with $VOCl_3$ in the polymerization of ethylene on the melt index of the polyethylene produced. The reactor was charged with 400 ml of hexane and 100 ml of hexane was added to the catalyst complexer. 1.0 ml (0.2 millimole) of methylene bis(aluminum dichloride) dissolved in methylene dichloride and 0.05 ml ($5 \times 10^{-6}$ mol) of $VOCl_3$ dissolved in methylene dichloride were added to the complexer with stirring. Then 20 microliters ($2.1 \times 10^{-4}$ mol) of t-butanol were added to the complexer. The mixture in the complexer was stirred for about 3 minutes and then the catalyst from the complexer and the remaining hexane to make up to 1 liter of hexane were charged to the polymerization reactor with stirring. The reactor was flushed with ethylene by pressuring to 50 psig and venting. The reactor was pressured to 45 psig with ethylene and then to 90 psig with hydrogen. The stirrer was turned on and 90 psig maintained by ethylene feed to the reactor. Run time was one hour and due to the exothermic heat of reaction, the temperature rose from 40° to 64° C. and then fell back to 53° C. At the end of the hour, the reactor was vented, was flushed with nitrogen, 500 ml of hexane was added to the reactor and the contents of the reactor were dumped through the bottom drain. The reactor was rinsed with 1 liter of hexane, the polymer was isolated by filtering under vacuum, the polymer was dried on the filter using a rubber dam and the polymer was treated with 35 mg of "IONOL" dissolved in 35 ml of methanol. The polymer product was dried overnight in a vacuum oven at 65° C. and the yield of polymer was 58.7 g. (11,740 g. polymer/millimole $VOCl_3$). The $I_2$ melt index of the polymer was 0.36 dg./min.

Instead of water to promote the polymerization, in Example 2, t-butanol was used since it has been found that better control of the polymerization catalyst is obtained with t-butanol than with water.

It is seen in comparing Examples 1 and 2 that the melt index is much higher in the first example. This higher melt index is due to the small amount of bromoaluminum compound such as $Br_2AlCH_2AlBr_2$ which is present in Example 1 but which is not present in Example 2. Over a period of time, in the presence of dichloromethane, a halogen exchange occurs as follows:

$Br_2AlCH_2AlBr_2 + 2CH_2Cl_2 \quad Cl_2AlCH_2AlCl_2 + 2CH_2Br_2$, and the $Br_2AlCH_2AlBr_2$ is destroyed; furthermore, there may be intermediate compositions wherein both Br and Cl are on the same molecule. The $Br_2AlCH_2AlBr_2$ is present in the Example 1 catalyst because it is used as an initiator for the reaction of aluminum with dichloromethane and is made by reacting dibromomethane with aluminum.

EXAMPLE 3

This example is to compare methylene bis(aluminum dibromide) with methylene bis(aluminum dichloride) as a polymerization catalyst component with $VOCl_3$ to see the comparative effect on the melt index of the polyethylene product. As a result of experiments, such as Examples 1 and 2, it was suspected that the methylene bis(aluminum dibromide) promoter used in making methylene bis(aluminum dichloride) might be responsible for the higher melt index product in the freshly prepared catalyst but that the effect was lost with aging of the catalyst. The methylene bis(aluminum dibromide) is made in a similar manner to that described for making the promoter of copending application Ser. No. 620,669, filed Mar. 6, 1967. 1.6254 g. (0.0602 g. atom) of aluminum sheet (99.99 percent aluminum) was cut into ⅛-inch square pieces and was charged to a 200 ml round-bottom flask equipped with a magnetic stirring bar, reflux condenser and fitted with a three-way stopcock for nitrogen blanketing. All transfers to the reactor and the reaction in the reactor itself was carried out under purified dried nitrogen blanketing. Fifty ml of dibromomethane and one crystal of iodine were added to the reactor. The dibromomethane had been carefully dried by passing it through a molecular sieve column. The mixture in the flask was heated, within about 5 minutes the iodine color had disappeared and in about an additional 5 minutes an exothermic reaction began. After the exothermic reaction began, no further external heat was provided for the reaction and in a short time the reaction was complete, all of the aluminum having been dissolved.

This methylene bis(aluminum dibromide) solution was used with $VOCl_3$ to polymerize ethylene as follows: The reactor was charged with the materials after making the complexed catalyst in a similar manner as described in the previous examples. To make the catalyst, 0.33 ml (0.2 millimole) of methylene bis(aluminum dibromide) slurried in methylene dibromide, 0.02 ml ($5 \times 10^{-6}$ mol) of $VOCl_3$ dissolved in methylene dichloride and 15 microliters of t-butanol were used. As usual, in the polymerization, a total of 1 liter of hexane was used in the polymerization reactor. During the polymerization which ran for 1 hour, the usual 50:50 volume mixture of ethylene and hydrogen was used and the pressure was maintained at 90 psig with added ethylene. At the end of the 1 hour of polymerization, the reactor was vented, flushed with nitrogen, 500 ml of hexane was added to the reactor and the contents of the reactor were dumped through bottom drain. The reactor was then rinsed with 1.5 liters of hexane, the polymer was isolated by filtering under vacuum, the polymer was dried on the filter using a rubber dam and the polymer was treated with 35 mg of "IONOL" dissolved in 35 ml of methanol. The polymer was dried overnight in a vacuum oven at 65° C. and polymer yield was 54.8 g. (10,960 g. of polymer/millimole $VOCl_3$). The polymer had a melting point of 130°–131° C. and the melt index of the polymer was too high to measure using a 2-kilogram load, i.e., the $I_2$ melt index test. In the catalyst of this example, an equivalent amount of $VOF_3$ or $VCl_4$ could have been used rather than the $VOCl_3$.

EXAMPLE 4

This example describes the use of methylene bis(aluminum dichloride) which was stored four days in the dark and refrigerated as a catalyst component with $VOCl_3$ to polymerize ethylene. The reactor was charged with 400 ml of hexane and 100 ml of hexane was added to the catalyst complexer. 1.0 ml (0.2 millimole) of Methylene bis(aluminum dichloride) dissolved in $CH_2Cl_2$, (kept refrigerated and in the dark for four days before use), then 10 microliters of t-butanol and finally 0.05 ml ($5 \times 10^{-6}$ mol) of $VOCl_3$ dissolved in methylene dichloride were added to the complexer. The mixture in the complexer was stirred for three minutes and then the complexed catalyst and the remaining hexane to make up to 1 liter of hexane were charged to the reactor with stirring. The reactor was warmed to 38° C. and the stirrer turned off. The reactor was flushed with ethylene by pressuring to 50 psig and venting. The reactor was pressured with ethylene to 45 psig and then with hydrogen to 90 psig. The stirrer was turned on in the reactor and the pressure maintained at 90 psig with added ethylene. Polymerization was run for 3 minutes, the reactor was vented and repressured with ethylene and hydrogen as before, after which time the polymerization was continued for 1 hour. At the end of the polymerization the reactor was vented, flushed with nitrogen, 500 ml of hexane added and the reactor contents were dumped through the bottom drain. The reactor was rinsed with 1 liter of hexane, the polyethylene was separated by filtering under vacuum, the polymer was dried on the filter with a rubber dam and the polymer was treated with 35 mg. of "IONOL" in 35 ml of methanol. The polymer was dried overnight in a vacuum oven at 65° C. to yield 53.5 g. of solid polyethylene (10,700 g. polymer/millimole $VOCl_3$). The $I_2$ melt index of this polymer was 3.7 dg./min. indicating that in spite of the refrigeration and darkness maintained in the storage of the catalyst after it was made, the catalyst had aged appreciably as far as the melt index of the polymer produced, i.e., the breakdown of the $BR_2AlCH_2lBr_2$ initiator by halogen exchange as indicated in Example 2 had occurred in spite of refrigeration and darkness.

EXAMPLE 5

It is seen from Example 3 that increased molecular weight control is obtained when methylene bis(aluminum dibromide) is used as compared to methylene bis(aluminum dichloride) as a catalyst component with $VOCl_3$. This experiment uses vanadium acetylacetonate bromide with methylene bis(aluminum dichloride) instead of $VOCl_3$. The vanadium compound is made by reacting equimolar amounts of bromine and vanadium acetylacetonate. To a 50 ml flask equipped with a three-way stopcock was charged 10 ml (1 millimole) of vanadium acetylacetonate

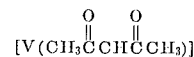

dissolved in methylene dichloride. Twenty-six microliters ($1 \times 10^{-3}$ mol) of bromine was added to the flask using a syringe. No observable color change or heat of reaction was observed; however, a sample of the reaction product was analyzed by electron spin resonance tests (ESR) and the spectra indicated the presence of a $V^{IV}$ compound. Therefore, the composition of this product is

The polymerization is carried out in the usual manner. Charges to the complexer and reactor were as follows: 1.0 ml ($2 \times 10^{-4}$ mol) of methylene bis(aluminum dichloride) 0.05 ml (5 × 10⁻⁶ mol) of the vanadium acetlyacetonate bromide product made in the previous paragraph, 1 liter of hexane and 10 microliters (1 × 10⁻⁴ mol) of t-butanol. Polymerization run time was 1 hour and due to the exothermic heat of reaction, the temperature in the reactor rose from 41° to 69.5° C. and then dropped back to 54° C. The reactor was pressured to 45 psig with ethylene and then to 45 psig with hydrogen to give a total pressure of 90 psig which was maintained during the polymerization with added ethylene. At the end of the 1 hour polymerization, the reactor was vented, flushed with nitrogen, 500 ml of hexane added and the contents of the reactor were dumped through the bottom drain. The reactor was rinsed with 1 liter of hexane, the polyethylene was isolated by filtering under vacuum, the polymer dried on the filter using a rubber dam and the polymer was treated with 40 mg. of "IONOL" dissolved in 40 ml of hexane. Polymer was dried overnight in a vacuum oven at 65° C. to yield 50.0 g. of polymer (10,000 g. of polymer/millimole of vanadium catalyst component).

EXAMPLE 6

This example describes the making of vanadium acetylacetonate iodide and the use of this vanadium compound as a catalyst with methylene bis(aluminum dichloride) in the polymerization of ethylene to see the effect on molecular weight control. The vanadium acetylacetonate iodide was made in the following manner: To a 100 ml round-bottom flask equipped with a three-way stopcock was added 0.1431 g. (1.13 × 10⁻³ g. atom) of iodine and then 11.3 ml (1.13 × 10⁻³ mol) of vanadium acetylacetonate dissolved in methylene dichloride was added to the flask using a syringe and the mixture was swirled until solution of the iodine was complete. No visible color changes or heat of reaction were observed; however, a sample of the product from the flask was analyzed by electron spin resonance (ESR) and the spectra indicated that the product was a $V^{IV}$ compound so the structure is

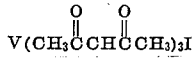

The polymerization was carried out in the usual manner. Charge of the materials to the complexer and polymerization reactor was as follows: 1.0 ml (2 × 10⁻⁴ mol) of methylene bis(aluminum dichloride) dissolved in methylene dichloride, 0.05 ml (5 × 10⁻⁶ mol) of vanadium acetylacetonate iodide dissolved in methylene dichloride and made as described in the previous paragraph, 1 liter of hexane and 10 microliters (1 × 10⁻⁴ mol) of t-butanol. The polymerization was carried out in the usual manner for 1 hour and during this hour the temperature in the reactor rose from 39° to 69.5° C. and then dropped back to 58° C. The usual 50:50 ethylene:hydrogen volume ratio was maintained in the polymerization vessel during the run. After the 1 hour of polymerization the reactor was vented, flushed with nitrogen, 500 ml of hexane added and the contents of the reactor dumped through the bottom drain. The reactor was rinsed with 1 liter of hexane, the polymer was isolated by filtering under vacuum, the polymer was dried on the filter using a rubber dam and was treated with 40 mg of "IONOL" in 40 ml of hexane. The solid polyethylene product was dried for 48 hours in a vacuum oven at 65° C, to yield 51.6 g. of polymer product (10,320 g. polyethylene/millimole vanadium acetylacetonate iodide).

EXAMPLE 7

This example describes the preparation of the reaction product of 2 g. atoms of iodine with 1 mol of vanadium acetylacetonate and the use of this product in conjunction with methylene bis(aluminum dichloride) to polymerize ethylene. To a 50 ml round-bottom flask equipped with a three-way stopcock was added 0.35 g. (0.00276 g. atom) of iodine and then 13.8 ml (1.38 × 10⁻³ mol) of vanadium acetylacetonate dissolved in methylene dichloride which was added to the flask using a syringe. The mixture in the flask was swirled until the iodine was all in solution and no visible color changes or heat of reaction were observed. A sample of this reaction mixture was analyzed by electron spin resonance (ESR) and the spectra from this analysis indicated that the compound was $V^{IV}$ indicating a composition of

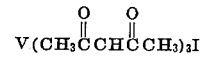

In what way the second atom of iodine is associated with this compound is not known but the following paragraph where the polymerization is described shows that the additional iodine present has had an appreciable effect on the melt index of the polymer.

The polymerization was carried out in the usual manner and the charge of materials to the complexer and polymerization vessel was as follows: 1.0 ml (2.0 × 10⁻⁴ mol) of methylene bis(aluminum dichloride) dissolved in methylene dichloride, 0.05 ml (5 × 10⁻⁶ mol) of V(acetylacetonate)₃·I, 1 liter of hexane and 10 microliters (1 × 10⁻⁴ mol) of t-butanol. Polymerization time was 60 minutes and the temperature rose from 46° to 74° C. and then dropped back to 60° C. during the polymerization. The usual 50:50 mol ratio of ethylene and hydrogen was maintained in the polymerization vessel. At the end of the polymerization, the reactor was vented, flushed with nitrogen, 500 ml of hexane added and the reactor contents were dumped through the bottom drain. The reactor was rinsed with 1 liter of hexane, the polymer was isolated by filtering under vacuum, the polymer dried on the filter using a rubber dam, and the polymer was treated with 35 mg of "IONOL" dissolved in 35 ml of hexane. The solid polyethylene product was then dried overnight in a vacuum oven at 65° C. to yield 42.5 g of polymer (8,500 g polymer/millimoles of vanadium acetylacetonate diiodide). The molecular weight of this polymer was so low that the I₂ melt index was too high to measure.

EXAMPLE 8

This example describes the use of ethyl aluminum sesquibromide with VOCl₃ to polymerize ethylene. The polymerization was carried on as follows: To the polymerization reactor was charged 0.88 ml (4 × 10⁻⁴ mol) of ethyl aluminum sesquibromide dissolved in ethyl bromide, 0.05 ml (5 × 10⁻⁶ mol) of VOCl₃ dissolved in methylene dichloride and 1 liter of hexane. The catalyst was complexed in the usual fashion before adding it to the polymerization reactor with additional hexane. Run time in the polymerization reactor was 80 minutes. The reactor was charged in the usual manner with 50:50 volume mixture of hydrogen and ethylene to 90 psig. Feed was maintained to the reactor at 90 psig with ethylene. The temperature rose in the reactor from 43° to 55° C. and then dropped back down to 40.5° C. The reactor was then vented, flushed with nitrogen and the contents of the reactor dumped through the bottom drain. The reactor was rinsed with 500 ml of hexane, the polyethylene was isolated by filtering under vacuum, dried on the filter using a rubber dam and dried overnight in a vacuum oven at 65° C. Yield of polymer was 7.5 g of solid polyethylene which represents 1,500 g polymer/millimole of VOCl₃. Viscosities were run on the polyethylene product at 0.1 percent and 0.5 percent concentration of the polymer in xylene and the viscosity numbers were 0.067 and 0.376 respectively at these concentrations. From the basic data, intrinsic viscosity was calculated and was 0.65 deciliters/g. Using the method of Trementozzi, Journal of Polymer Science, 22, 187 (1956), the molecular weight was calculated to be 20,000 and this molecular weight should be approximately the weight average molecular weight, i.e., an $M_w$ by analogy from data obtained on a similar polyethylene sample using gel permeation chromatography. A factor was obtained from data on a similar polymer sample and the number average molecular weight $M_n$ was estimated to be 7,150 for the polymer product of Example 8.

EXAMPLE 9

This example teaches the use of $VOBr_3$ as a catalyst component with methylene bis(aluminum dibromide). This polymerization experiment was carried out using similar equipment and in a similar manner to the other examples. Materials charged to the complexer and polymerization reactor were 0.33 ml ($2 \times 10^{-4}$ mols) of methylene bis(aluminum dibromide) slurried in methylene dibromide, 0.05 ml ($5 \times 10^{-6}$ mols) of $VOBr_3$ dissolved in methylene dibromide and 1 liter of hexane. Four hundred fifty ml of hexane were charged to the reactor and 50 ml of hexane to the complexer. The two catalyst components were then added to the complexer and complexing time was 2 minutes, after which time the complexed catalyst was charged to the reactor along with 500 ml additional hexane. The reactor was heated to 42° C., the stirrer was stopped, the reactor was pressured to 30 psig with ethylene and to 60 psig with hydrogen, then vented. The reactor was then pressured to 45 psig with ethylene and to 90 psig with hydrogen. The stirrer was started and the pressure was maintained at 90 psig with ethylene feed. After 1 hour run time the reactor was vented and dumped and the polymer was worked up and recovered in the usual manner. Yield was 61.2 g of low molecular weight solid polymer.

EXAMPLE 10

This example teaches the use of $VOBr_3$ as a catalyst component with methylene bis(aluminum dichloride). This polymerization was carried out using similar equipment and in a similar manner to the other examples. Materials charged to the complexer and polymerization reactor were 1 ml ($2 \times 10^{-4}$ mols) of methylene bis(aluminum dichloride) dissolved in methylene dichloride, 0.05 ml ($5 \times 10^{-6}$ mols) of $VOBr_3$ dissolved in methylene dibromide and 1 liter of hexane. Time in the complexer was 5 minutes and there was no color change in the catalyst during complexing. The polymerization was carried out in a similar manner to Example 9. Yield of polymer was 36.4 g (7,280 g. polymer/mol $VOBr_3$). Melt indexes on the polymer product were as follows: $I_2$ of 0.07 dg./min., $I_{10}$ of 0.85 dg./min. and an $I_{10}/I_2$ of 12.1. The $I_{10}$ is determined using a 10 kilogram load rather than a 2-kilogram load as in the $I_2$.

EXAMPLE 11

This example describes the polymerization of ethylene using tris(dimethylamino)vanadyl, $[(CH_3)_2N]_3VO$, as the transition metal component of the catalyst. The other component of the catalyst, methylene bis(aluminum dibromide) was made in the following fashion: To a dried 100 ml flask, fitted with a magnetic stirring bar, reflux condenser, and a three-way stopcock were charged in the following order: 1.620 g of 99.99 percent aluminum cut into ⅛-inch squares, 35 ml of dry methylene dibromide and 1 crystal of iodine. On heating the reaction mixture the purple iodine color disappeared and reflux began in the flask. The heating mantel was then removed and the reaction continued to reflux until all the aluminum had been reacted, giving a tan solution. When the reaction mixture had cooled, a tan precipitate formed and the methylene dibromide was distilled off under vacuum. Then 50 ml of hexane was added to the tan residue in the flask giving a tan slurry having $6 \times 10^{-4}$ moles of methylene bis(aluminum dibromide) per ml of slurry.

A solution of tris(dimethylamino)vanadyl in methylene dichloride was made up as follows: 1.99 g (0.01 moles) of tris(dimethylamino)vanadyl and 30 ml of methylene dichloride were added to a flask and a black solution resulted. The cocatalyst was then made in the following manner: 1.5 ml (0.5 millimoles) of tris(dimethylamino)vanadyl in methylene dichloride and 50 ml (30 millimoles) of the methylene bis(aluminum dibromide) in hexane were added to a flask blanketed with nitrogen and a gray colored slurry was formed wherein each ml of the slurry had $6 \times 10^{-4}$ moles of methylene bis(aluminum dibromide) and $1 \times 10^{-5}$ moles of tris(dimethylamino)vanadyl.

The polymerization was carried out in the following manner: With the stirrer on in the polymerization reactor 200 ml of hexane was charged to the polymerization reactor, 0.5 ml of the cocatalyst described in the previous paragraph was added and the catalyst was washed with an additional 800 ml of hexane. The reactor was heated to 62° C., was pressured to 18 psig with hydrogen (20 percent by volume) and from 18 psig to 90 psig with ethylene. During the polymerization there was constant ethylene feed at 90 psig and the polymerization temperature was controlled at about 70° C. by cooling. After one hour of polymerization, the reactor was vented, the contents of the reactor dumped and the reactor was rinsed with 1 liter of hexane. The polymer was filtered from the hexane, was boiled with 2 liters of dry methanol and refiltered to remove the methanol. The polymer was then dried in a vacuum oven overnight at 65° C. Yield of dried polymer was 23.6 g having an $I_2$ of 0.99, an $I_{10}$ of 12.6 and an $I_{10}/I_2$ of 13.

EXAMPLE 12

This example describes the copolymerization of ethylene with 1-hexene. Catalyst used was the typical catalyst made as described in examples above, consisting of $VOCl_3$ and methylene bis(aluminum dibromide). The amount of catalyst used was $5 \times 10^{-6}$ moles of $VOCl_3$ and $3 \times 10^{-4}$ moles of methylene bis(aluminum dibromide). The usual procedure was followed wherein first 200 ml of hexane were charged to the reactor, then the catalyst solution was washed in with an additional 800 ml of hexane. The reactor was heated to 66° C., was pressured to 10 psig with hydrogen and then the addition of ethylene and 1-hexene solution were started to the reactor simultaneously, pressuring the reactor to 90 psig with ethylene. During the 1 hour of polymerization wherein the temperature, most of time, was held in the mid 70's. 52 ml of a 1 percent solution of hexene in hexane was added to the reactor during the 1 hour. After the hour of polymerization the reactor was vented and dumped. The polymer was filtered under vacuum, was boiled in methanol, refiltered and placed in a vacuum oven overnight at 65° C. Yield of dried polymer was 40.5 g, 26,700 g polymer/g $VOCl_3$ having an $I_2$ of 0.7, an $I_{10}$ of 5.61, an $I_{10}/I_2$ of 20.8, a density of 0.956, an $M_n$ of 32,800, an $M_w$ of 96,800 and an $M_w/M_n$ of 2.95.

EXAMPLE 13

This example describes the copolymerization of ethylene with 1-butene. This polymerization was carried out in the similar fashion to the usual ethylene homopolymer polymerization. With the stirrer on in the polymerization reactor 200 ml of hexane was charged to the reactor, then the cocatalyst suspension was added, 2 ml containing $1.2 \times 10^{-3}$ moles of methylene bis(aluminum dibromide) and $2 \times 10^{-5}$ moles of $VOCl_3$. This catalyst was washed into the reactor with an additional 800 ml of hexane. The reactor was heated to 67° C., was pressured to 14 psig with hydrogen and then was pressured to 90 psig with a 99/1 mixture of ethylene/1-butene. Pressure was maintained at 90 psig by constant comonomer feed for the one hour of polymerization, after which time the reactor was vented, dumped and the polymer was filtered from the hexane. The polymer was reslurried in methanol, boiled, then filtered and was placed in a vacuum oven at 65° C. overnight to dry. Yield of polymer was 20.5 g having an $I_2$ of 0.15, an $I_{10}$ of 3.31, an $I_{10}/I_2$ of 22.

EXAMPLE 14

This example describes an ethylene/propylene copolymerization. This polymerization was conducted in a similar manner to the previous polymerization of Example 13. To the reactor was charged 200 ml of hexane and then the cocatalyst mixture was washed into the reactor with an additional 800 ml of hexane. The cocatalyst was 0.5 ml having $3 \times 10^{-4}$ moles of methylene bis(aluminum dibromide) and $5 \times 10^{-6}$ moles of $VOCl_3$ therein. The reactor was heated to 61° C. with steam, then vented. The reactor was pressured to 10 psig with hydrogen and from 10 to 90 psig with a 95.5/4.5 volume ratio of ethylene/propylene comonomer. Pressure was maintained at 90 psig with comonomer for 1 hour. The reactor was vented and the contents dumped. The polymer was separated from the hexane by filtration, was boiled in methanol, refiltered to separate the methanol and placed in a vacuum oven overnight to dry. Yield of polymer was 41.2 g having an $I_2$ of 0.093, an $I_{10}$ of 2.1, an $I_{10}/I_2$ of 22.6 and a density of 0.953.

EXAMPLE 15

This example describes another ethylene/propylene copolymerization. To the reactor was charged 200 ml of hexane and then the cocatalyst was washed into the reactor with the remaining 800 ml of hexane. The cocatalyst consisted of 0.3 ml containing $2 \times 10^{-4}$ moles of methylene bis(aluminum dibromide) and $5 \times 10^{-6}$ moles of $VOCl_3$. The reaction mixture was heated to 65° C., pressured to 14 psig with hydrogen and from 14 to 90 psig with the ethylene/propylene comonomer mixture having a ratio of 95.5/4.5 ethylene to propylene therein. The polymerization reaction was allowed to continue at about 71° C. for 1 hour maintaining the 90 psig with ethylene/propylene comonomer mixture feed. At the end of the hour, the reactor was vented, dumped, the polymer was filtered from the hexane, the polymer was boiled in methanol, refiltered to remove the methanol and the polymer was dried in a vacuum oven overnight at 65° C. Yield of dried polymer was 33.0 g having an $I_2$ of 0.56, an $I_{10}$ of 9.51 and an $I_{10}/I_2$ of 17.0.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, the catalysts of this invention can be used without solvent with the catalyst components being deposited on an inert carrier, such as particles of polymer, preferably particles of the same type of polymer as the catalyst is being used to make, or an inorganic carrier such as alumina or silica, or solid catalyst itself without a carrier can be used in a fluidized bed or similar type reactor. Accordingly, modifications are contemplated which can be made without departing from the spirit of the described invention.

What is claimed is:

1. A catalyst useful in making ethylene polymers consisting essentially of a mixture of (1) an organoaluminum compound of the formula $X_2AlCH_2AlX_2$ wherein X is a halogen atom with at least one X being a bromine atom, or a mixture of such compounds with each other or with $Cl_2AlCH_2AlCl_2$ and (2) a compound of vanadium, said organoaluminum compound containing the combined bromine in an amount sufficient to increase the melt index of an ethylene polymer produced by the use of said catalyst as compared to the melt index of an ethylene polymer prepared under otherwise identical conditions using said organoaluminum compound free from combined bromine.

2. A catalyst of claim 1 wherein (1) is $Br_2AlCH_2AlBr_2$.
3. A catalyst of claim 2 wherein (2) is $VOCl_3$.
4. A catalyst of claim 2 wherein (2) is $VOF_3$.
5. A catalyst of claim 2 wherein (2) is $VOBr_3$.
6. A catalyst of claim 2 wherein (2) is $VCl_4$.
7. A catalyst of claim 2 wherein (2) is $((CH_3)_2N)_3VO$.
8. An improved catalytic process for making ethylene polymers comprising polymerizing ethylene in the presence of hydrogen and a catalyst consisting essentially of a mixture of (1) an organoaluminum compound of the formula $X_2AlCH_2AlX_2$ wherein X is a halogen atom with at least one X being a bromine atom, or a mixture of such compounds with each other or with $Cl_2AlCH_2AlCl_2$ and (2) a compound of vanadium, said organoaluminum compound containing the combined bromine in an amount sufficient to increase the melt index of an ethylene polymer produced by the use of said catalyst as compared to the melt index of an ethylene polymer prepared under otherwise identical conditions using said organoaluminum compound free from combined bromine.
9. A process of claim 8 wherein a sufficient amount of oxygen has been added to modify the catalyst activity.
10. A process of claim 8 wherein the polymerization is carried out in the presence of an organic solvent.
11. A process of claim 8 wherein the polymerization is carried out at a pressure in the range of about 2 to 10 atmospheres.
12. A process of claim 8 wherein ethylene is copolymerized with a minor amount by weight of another ethylenically unsaturated hydrocarbon.
13. A process of claim 12 wherein said other ethylenically unsaturated hydrocarbon is butene-1.
14. A process of claim 12 wherein said other ethylenically unsaturated hydrocarbon is propylene.
15. A process of claim 12 wherein said other ethylenically unsaturated hydrocarbon is hexene-1.
16. A process of claim 8 wherein (1) is $Br_2AlCH_2AlBr_2$.
17. A process of claim 16 wherein (2) is $VOCl_3$.
18. A process of claim 16 wherein (2) is $VOF_3$.
19. A process of claim 16 wherein (2) is $VOBr_3$.
20. A process of claim 16 wherein (2) is $VCl_4$.
21. A process of claim 16 wherein (2) is $((CH_3)_2N)_3VO$.
22. A process of claim 16 wherein said vanadium compound has a valence from 3 to 5, the polymerization is carried out in the presence of an inert organic solvent and a sufficient amount of oxygen is present to promote catalyst activity.
23. A process of claim 22 wherein (2) is $VOCl_3$.

* * * * *

PO-1050
(5/69)

UNITED STATES PATENT OFFICE
CERTIFICATE OF CORRECTION

Patent No. __3,674,766__  Dated __July 4, 1972__

Inventor(s) __Edward H. Mottus et al__

It is certified that error appears in the above-identified patent and that said Letters Patent are hereby corrected as shown below:

Front page, Col. 2, Item [57], Abstract line 6, for "$X_2ALCH_2(\overset{X}{A}LCH_2)_pALX_2)$" read -- $X_2AlCH_2(\overset{X}{Al}CH_2)_pAlX_2$ --.

Front page, Col. 2, Item [57], Abstract, line 8, insert the phrase "and p is 0 or 1" after the word "atom".

Front page, Col. 2, Item [57], Abstract, line 9, cancel the phrase "and p is 0 or 1".

In Col. 1, line 26, for "$Cl_2AlCH_2lCl_2$" read -- $Cl_2AlCH_2AlCl_2$ --.

In Col. 1, lines 31-34, read "+ a compound" as distinct from the formula and as part of the running text.

In Col. 1, line 48, for "$Br_2AlCH_2lBrCl$" read -- $Br_2AlCH_2AlBrCl$ --.

In Col. 1, line 50, for "$Br_2AlCH_2lBrCH_2AlBr_2$" read -- $Br_2AlCH_2AlBrCH_2AlBr_2$ --.

In Col. 2, line 68, for "probably" read -- probable --.

In Col. 3, line 7, for "hese apor hase" read --these vapor phase --.

PO-1050
(5/69)

UNITED STATES PATENT OFFICE
CERTIFICATE OF CORRECTION

Patent No. __3,674,766__    Dated __July 4, 1972__

Inventor(s) __Edward H. Mottus et al__

It is certified that error appears in the above-identified patent and that said Letters Patent are hereby corrected as shown below:

page 2 -- cont'd

In Col. 3, line 9, for "hase" read -- phase --.

In Col. 6, line 43, for "BR$_2$AlCH$_2$lBr$_2$" read -- Br$_2$AlCH$_2$AlBr$_2$ --.

In Col. 6, lines 57-60, for "[V(CH$_3\overset{O}{\overset{\|}{C}}$CH$\overset{O}{\overset{\|}{C}}$CH$_3$)]" read --
[V(CH$_3\overset{O}{\overset{\|}{C}}$CH$\overset{O}{\overset{\|}{C}}$CH$_3$)$_3$] --.

In Col. 7, line 25, insert the word "component" after the word "catalyst".

Signed and sealed this 1st day of May 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,674,766  Dated July 4, 1972

Inventor(s) EDWARD H. MOTTUS, ET. AL.

It is certified that error appears in the above-identified patent and that said Letters Patent are hereby corrected as shown below:

On the front page, column 2, Item (57), Abstract, line 4, "ioda aluminum" should read -- iodo aluminum -- .

Signed and sealed this 19th day of February 1974.

(SEAL)
Attest:

EDWARD M. FLETCHER, JR.
Attesting Officer

C. MARSHALL DANN
Commissioner of Patents